July 15, 1958 W. F. BRANNAN 2,843,277
TRUCK SIDE-LOADER
Filed Jan. 29, 1957 2 Sheets-Sheet 1
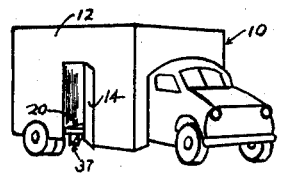
Fig. 1.
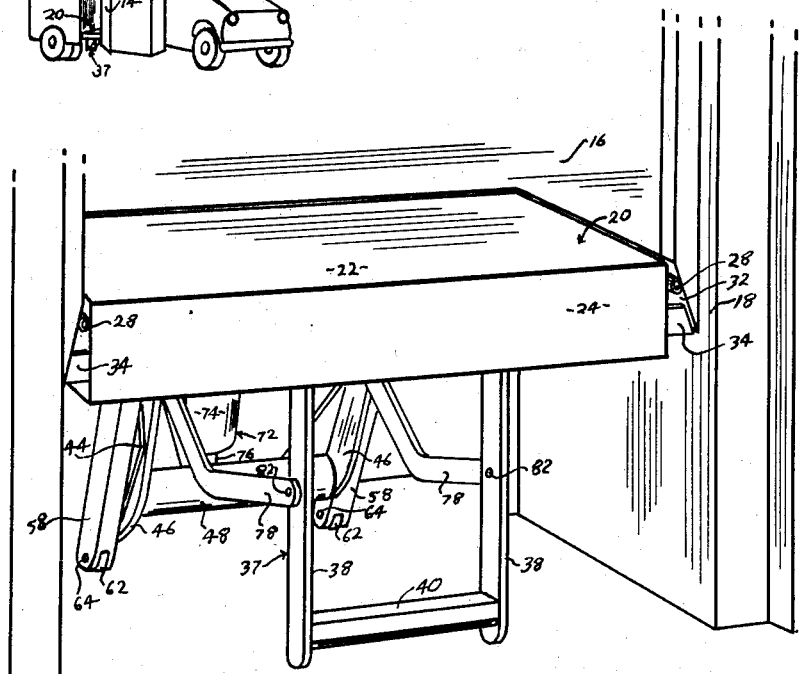
Fig. 2.
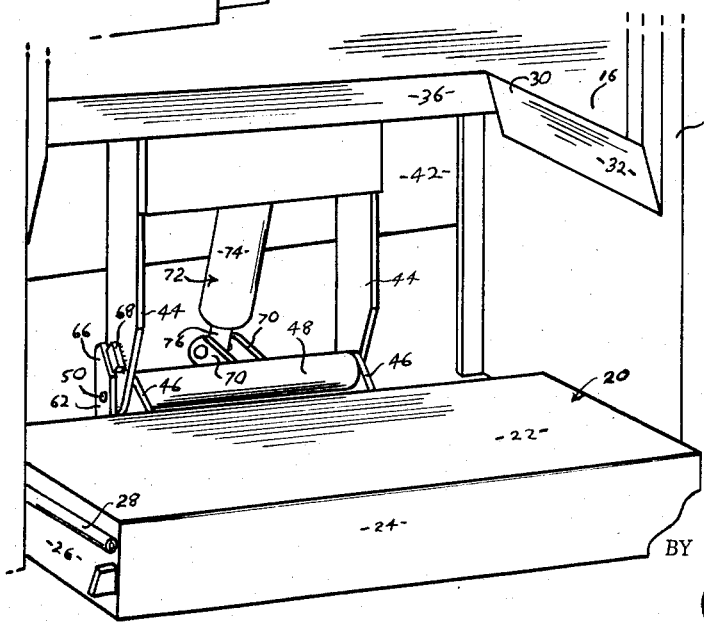
Fig. 3.
WALTER F. BRANNAN
INVENTOR.
BY 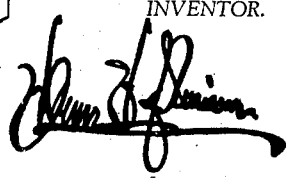

July 15, 1958 W. F. BRANNAN 2,843,277
TRUCK SIDE-LOADER
Filed Jan. 29, 1957 2 Sheets-Sheet 2
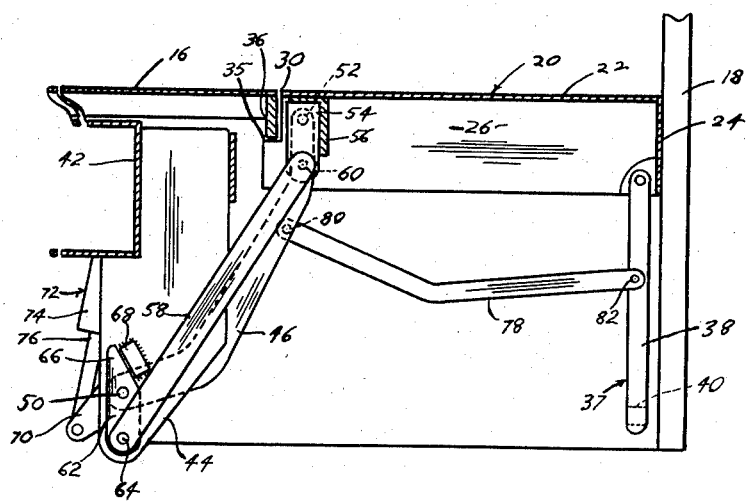
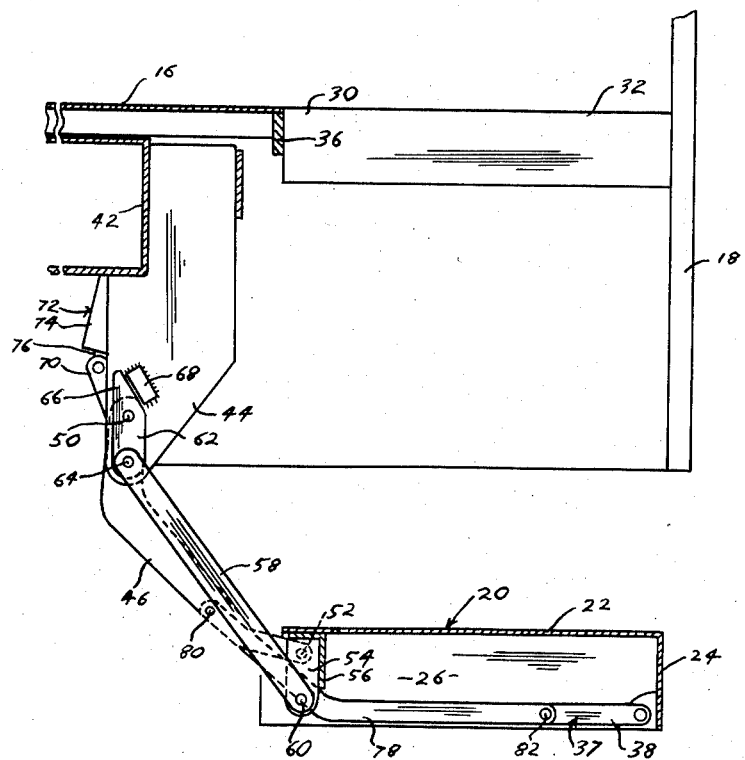
WALTER F. BRANNAN
INVENTOR.
BY ര
United States Patent Office 2,843,277
Patented July 15, 1958

2,843,277

TRUCK SIDE-LOADER

Walter F. Brannan, Los Angeles, Calif.

Application January 29, 1957, Serial No. 637,036

5 Claims. (Cl. 214—77)

My present invention relates to side door entrances for closed trucks, and it relates particularly to such a truck side door entrance in which a segment of the truck floor is vertically movable between an uppermost position in which this segment is flush with the truck floor, and a lowermost position in which this segment of the floor rests on or is positioned adjacent to the ground below the truck.

Conventional side door entrances for closed trucks merely consist of a vertical door within which is the usual unitary floor which comes all of the way out to the edge of the truck adjacent to the inside of the door when it is closed. Small ladders are sometimes provided which hang down from the outer edge of the floor to permit a man to climb up to the floor level from the ground.

It has long been a problem in the art to provide convenient means for loading and unloading heavy objects, such as milk crates and the like onto and off of the truck floor through such a side door, as the truck floor is so high above the ground. One prior art means for loading and unloading such heavy objects onto and off of the floor of the truck through a side door is to utilize a lifting cart or truck which operates completely independently of the truck upon which the heavy objects are to be loaded, and which lifts the objects up to the floor level of the truck or carries down from the floor level, as the case may be.

However, such a separate cart or truck is often not available, and is usually difficult to manipulate into the required position for such loading or unloading.

In view of these and other problems in the art, it is an object of my present invention to provide a side entrance in a closed truck in which a segment of the floor directly inside of the doorway is vertically movable between an uppermost position in which the segment is flush with the truck floor, and a lowermost position in which the segment is on or just above the ground; whereby objects to be loaded onto the truck floor may first be loaded onto the floor segment when it is in its lowermost position, and then may be lifted to the truck floor level on the movable segment, from which position the objects may be slid horizontally to any part of the truck floor; and conversely, whereby objects to be unloaded from the truck may first be slid onto the floor segment from the truck floor, and then lowered on the segment to a position just above the ground.

Another object of my present invention is to provide a vertically movable floor segment just within a side door of a closed truck which is hydraulically actuated to permit heavy loads to be moved between approximately ground level and the level of the truck floor on the movable segment.

Another object of my present invention is to provide a vertically movable floor segment just within a side door of a closed truck, in which a mounting ladder is pivotally mounted underneath the vertically movable floor segment to pivot out to a vertical, operative position when the movable floor segment is in its uppermost position flush with the truck floor, and to pivot into a folded position up underneath the movable floor segment when the movable segment is in its lowermost position adjacent to the ground, whereby the mounting ladder will be out of the way to permit the movable segment to move downwardly to the lowermost position that is directly on or near to the ground.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specification:

Figure 1 is a perspective view of a truck having a side door entrance embodying my present invention.

Figure 2 is a perspective view of my present invention showing my vertically movable floor segment in its uppermost position flush with the truck floor.

Figure 3 is a perspective view similar to Figure 2, but with my floor segment lowered substantially below the level of the truck floor.

Figure 4 is a vertical section along the line 4—4 in Figure 2.

Figure 5 is a vertical section along the line 5—5 in Figure 3.

Referring to my drawings, my present invention is applied to the conventional type of truck 10 which has a closed rear portion 12 with a vertically hinged side door 14.

The truck floor 16 normally comes out to the door molding 18. According to my present invention, I provide an independently movable floor segment 20, the top part of which is formed by a horizontal plate portion 22, and which has a downwardly extending front flange 24 and similar downwardly extending side flanges 26. Flexible sealing tubes 28 extend longitudinally along the respective side flanges 26.

A rectangular recess 30 is provided in floor 16, with its side edges 32 extending directly into the truck from the door molding 18. The side edges 32 of rectangular recess 30 slope downwardly and outwardly, whereby the sealing tubes 28 will come into a cushioning engagement therewith when the floor segment 20 is in its uppermost position flush with the truck floor 16.

I provide laterally extending positioning lugs 34 on the sides 26 of floor segment 20, these having tapered outer ends for coming into stopping engagement with the sloping side edges 32 of rectangular recess 30.

Floor segment 20 is also further positioned in its uppermost position by means of an upwardly facing positioning shoulder 35 at the rear of floor segment 20 which operatively engages a downwardly extending flange 36 at the rear of recess 30.

I provide a ladder 37 which is normally vertically positioned when the floor segment 20 is in its uppermost position as shown in Figures 1, 2 and 4, ladder 37 being composed of a pair of vertical side members 38 and a horizontal rung 40 at the bottom of side members 38.

I will now describe my presently preferred mechanism for actuating my movable floor segment 20 to move segment 20 between its uppermost position shown in Figures 1, 2 and 4, and its lowermost position on or adjacent to the ground shown in Figure 5.

Integrally supported on the truck frame member 42 is a pair of spaced, depending bracket members 44. Pivotally mounted near the lower ends of bracket members 44 are a pair of parallel lifting arms 46 which are welded at their inner ends to the ends of a tubular member 48. The entire integral assembly of lifting arms 46 and tubular member 48 is pivoted on depending bracket members 44 by means of a transverse pivot rod 50.

The forward ends of lifting arms 46 are pivotally connected to the floor segment 20 near its rear edge by means of pivot pins 52 that are mounted in pin mounting members 54. To add rigidity to the rear edge of floor segment 20, and to provide a good mounting for pin mounting members 54, I provide a downwardly extending angle iron member 56 along the lower rear edge of the horizontal plate portion 22 of floor segment 20, angle iron 56 opening rearwardly.

I provide a pair of compression arms 58, the outer ends of compression arms 58 being pivotally connected to pin mounting members 54 by means of pivot pins 60, pins 60 being downwardly spaced from pins 52.

A link member 62 is pivotally connected at its lower end to the inner end of each of the compression arms 58 by means of pivot pin 64, the upper ends of link members 62 being pivotally mounted on the ends of pivot rod 50 which extend through depending bracket members 44.

Stop arms 66 extend upwardly from link members 62, and operatively engage respective stop members 68 that are welded or otherwise integrally affixed to bracket members 44.

Lifting arms 46, compression arms 58, pin mounting members 54 (i. e., floor segment 20) and link members 62 form a parallelogram, and since the operative engagement between stop arms 66 and stop members 68 prevents clockwise rotation of link members 62, clockwise rotation of floor segment 20 is likewise prevented. Thus, throughout the entire movement of floor segment 20 between the level of truck floor 16 and ground level, the floor segment 20 will be maintained in a horizontal position.

A pair of spaced torque members 70 are integrally attached to the center of tubular member 48, extending rearwardly therefrom. A hydraulic ram 72 is pivotally connected at one end to the truck frame, and at its other end to torque arms 70. The hydraulic ram consists of the conventional hydraulic cylinder 74 with piston rod 76 extending therefrom. The outer end of piston rod 76 is pivotally connected between the torque arms 70, with the other end of hydraulic cylinder 74 being pivotally mounted on the truck frame.

A pair of spaced, parallel ladder actuating arms 78 are pivotally connected at their inner ends to the respective lifting arms 46 by means of pivot pins 80, and the outer ends of ladder actuating arms 78 are pivotally connected by means of pivot pins 82 to the respective vertical ladder side members 38.

My movable floor segment 20 will normally be disposed in its uppermost position as shown in Figures 1, 2 and 4 of the drawings, in which position the horizontal plate portion 22 thereof is flush with the truck floor 16.

In this uppermost position of my floor segment 20, the ladder 37 will be in its vertical position as shown in Figures 2 and 4 to permit a man to easily climb up on to the floor segment 20.

In order to move floor segment 20 downwardly, a valve means (not shown) is actuated to release hydraulic fluid from hydraulic cylinder 74, permitting the hydraulic ram 72 to collapse, thereby permitting tubular member 48 and lifting arms 46 to rotate clockwise about pivot rod 50, whereby the floor segment 20 will be lowered.

Conversely, when it is desired to raise the floor segment 20, hydraulic fluid under pressure will be introduced to the hydraulic cylinder 74 by selective means (not shown), whereby the tubular member 48 and lifting arms 46 will be rotated anti-clockwise in the drawings about pivot rod 50 to raise floor segment 20.

During the operation in which the floor segment 20 is lowered, the lifting arms 46 pivot clockwise about the pivot pins 52 that are mounted in members 54 of floor segment 20, whereby ladder actuating arms 78 will be withdrawn rearwardly to collapse ladder 37 under floor segment 20 between the side flanges 26.

Conversely, when floor segment 20 is raised, lifting arms 46 will pivot anti-clockwise about pivot pins 52, thereby pushing ladder actuating arms 78 outwardly to pivot ladder 37 back out to its vertical position.

It will be apparent that my present invention greatly simplifies the loading of a side door type of truck, such as conventional wholesale milk trucks, by permitting a floor segment that is at ground level to be loaded and then hydraulically moved up to floor level. When on the ground, the floor segment can be conveniently loaded either manually or by means of loading carts or trucks.

It is to be understood that the form of my invention herein shown and described is my preferred embodiment and that various changes in the shape, size and arrangement of parts may be resorted to without departing from the spirit of my invention, or the scope of my appended claims.

I claim:

1. In a truck having an enclosed rear storage portion, a side doorway providing access to the inside of said storage portion, a floor in said storage portion, an independently vertically movable floor segment disposed adjacent to said doorway, selectively operable actuating means for moving said floor segment between an uppermost position in which said floor segment is substantially flush with said floor, forming a part of said floor adjacent to said doorway, and a lowermost position substantially below the level of the truck floor, and a ladder depending from the front portion of said floor segment when said floor segment is in its uppermost position at substantially the same level as the truck floor, said ladder folding underneath said floor segment as said segment is lowered, whereby said ladder will not interfere with movement of said floor segment to a position close to the ground.

2. In a truck having an enclosed rear storage portion, a side doorway providing access to the inside of said storage portion, a floor in said storage portion, an independently vertically movable floor segment disposed adjacent to said doorway, selectively operable actuating means for moving said floor segment between an uppermost position in which said floor segment is substantially flush with said floor, forming a part of said floor adjacent to said doorway, and a lowermost position substantially below the level of the truck floor, a molding extending downwardly from the truck floor adjacent to said floor segment, and abutment means operatively engageable between said molding and said floor segment when said floor segment moves upwardly to substantially the same level as the truck floor, whereby further upward travel of said floor segment is prevented.

3. The device of claim 2 in which a portion of said molding slants downwardly away from said floor segment and a positioning member extending outwardly from the floor segment adjacent to said slanted molding, whereby said floor segment will be positioned relative to the truck floor when said floor segment is raised to substantially the same level as the truck floor by operative engagement of said positioning member and said slanted molding.

4. The device of claim 3 in which said slanted molding is provided on the opposed sides of said molding at opposite sides of said doorway, and in which one of said positioning members is provided on each side of said floor segment.

5. In a truck having an enclosed rear storage portion, a side doorway providing access to the inside of said storage portion, a floor in said storage portion, an independently vertically movable floor segment disposed adjacent to said doorway, selectively operable actuating means for moving said floor segment between an uppermost position in which said floor segment is substantially flush with said floor, forming a part of said floor adjacent to said doorway, and a lowermost position substantially below the level of the truck floor, said actuating means including a bracket depending from the truck frame, a pair of lifting arms pivotally mounted on said bracket, said lifting arms extending forward from said bracket and being pivotally connected to said floor segment at their forward ends, a hydraulic ram operatively connected between the truck frame and said lifting arms to permit the arms to be selectively raised and lowered, and a pair of compression arms pivotally connected at one end to said bracket in vertically spaced relation to said lifting arms and pivotally connected at the other end to said floor segment in similarly vertically spaced relation to said lifting arms, whereby said floor segment will be maintained substantially horizontal at all times, and a ladder pivotally mounted on said floor segment near its front edge said ladder extending downwardly from said floor segment, and a link member pivotally connected at one end to one of said arms and at its other end to said ladder, whereby downward movement of said floor segment will be accompanied by folding of said ladder underneath said floor segment.

References Cited in the file of this patent

UNITED STATES PATENTS

| | | |
|---|---|---|
| 2,158,596 | Swanson | May 16, 1939 |
| 2,530,341 | Satsky | Nov. 14, 1950 |
| 2,752,052 | Trotter et al. | June 26, 1956 |
| 2,779,488 | Trotter et al. | Jan. 29, 1957 |

FOREIGN PATENTS

| | | |
|---|---|---|
| 486,962 | Great Britain | June 14, 1938 |